(12) United States Patent
Shulman et al.

(10) Patent No.: US 9,780,969 B2
(45) Date of Patent: Oct. 3, 2017

(54) TRANSFERRING DATA BETWEEN ELEMENTS OF A CABLE COMMUNICATION DEVICE

(71) Applicant: Intel Corporation, Santa Clara, CA (US)

(72) Inventors: Shaul Shulman, Ramat Gamat (IL); Amos Klimker, Jerusalem (IL); Elihay Shalem, Petah Tiqwa (IL); Eran Eran Vodevoz, Kadima-Zoram (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/580,904

(22) Filed: Dec. 23, 2014

(65) Prior Publication Data

US 2016/0182265 A1    Jun. 23, 2016

(51) Int. Cl.
*H04L 25/02* (2006.01)
*H04L 25/14* (2006.01)
*H04L 27/00* (2006.01)
*H04L 27/38* (2006.01)
*H04L 1/00* (2006.01)

(52) U.S. Cl.
CPC .............. *H04L 25/02* (2013.01); *H04L 25/14* (2013.01); *H04L 1/0071* (2013.01); *H04L 27/0002* (2013.01); *H04L 27/38* (2013.01)

(58) Field of Classification Search
CPC ....... H04L 5/14; H04L 1/0083; H04L 1/0041; H04L 12/2801; H04L 25/067; H04L 1/0045; H04M 11/00; H04N 21/6118; H04N 21/6168

USPC ......................................... 375/340, 222, 316
See application file for complete search history.

(56) References Cited

U.S. PATENT DOCUMENTS

| | | | |
|---|---|---|---|
| 9,130,609 B2 * | 9/2015 | Kummetz | ............... H04L 25/05 |
| 2002/0061012 A1 * | 5/2002 | Thi | .......................... H04B 3/23 370/352 |
| 2005/0190777 A1 * | 9/2005 | Hess | ...................... H04H 20/28 370/401 |
| 2006/0007959 A1 * | 1/2006 | Merriam | ............. H04L 27/0002 370/487 |
| 2007/0294738 A1 * | 12/2007 | Kuo | .................... H04N 21/4263 725/116 |
| 2009/0046787 A1 * | 2/2009 | Uesugi | .................. H04L 5/0007 375/260 |
| 2009/0066850 A1 * | 3/2009 | Wu | ......................... H04N 5/50 348/731 |
| 2014/0119392 A1 * | 5/2014 | Keegan | .................. G01S 19/30 370/542 |

\* cited by examiner

*Primary Examiner* — Helene Tayong
(74) *Attorney, Agent, or Firm* — Jordan IP Law, LLC

(57) ABSTRACT

Systems, apparatus and methods are described including operations for demodulating, via a front end demodulator of an analog front end processor, at least a portion of digital sample data into front end demodulated data. A framer of the analog front end processor may frame data from a selection of the front end demodulated data as well as undemodulated digital sample data remaining from the digital sample data, into frames of front end demodulated data and/or undemodulated digital sample data.

11 Claims, 6 Drawing Sheets

TRANSFERRING DATA BETWEEN ELEMENTS OF A CABLE COMMUNICATION DEVICE

RELATED APPLICATIONS

The present application is related to U.S. application Ser. No. 13/976,468, filed Mar. 28, 2012, and titled "METHOD, APPARATUS AND SYSTEM OF TRANSFERRING DATA BETWEEN ELEMENTS OF A CABLE COMMUNICATION DEVICE".

BACKGROUND

A cable network may include a cable modulator-demodulator (modem) capable of transferring downstream data from a Cable-Modem-Termination-System (CMTS) to one or more devices (subscriber devices), and transferring upstream data from the devices to the CMTS.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1A:
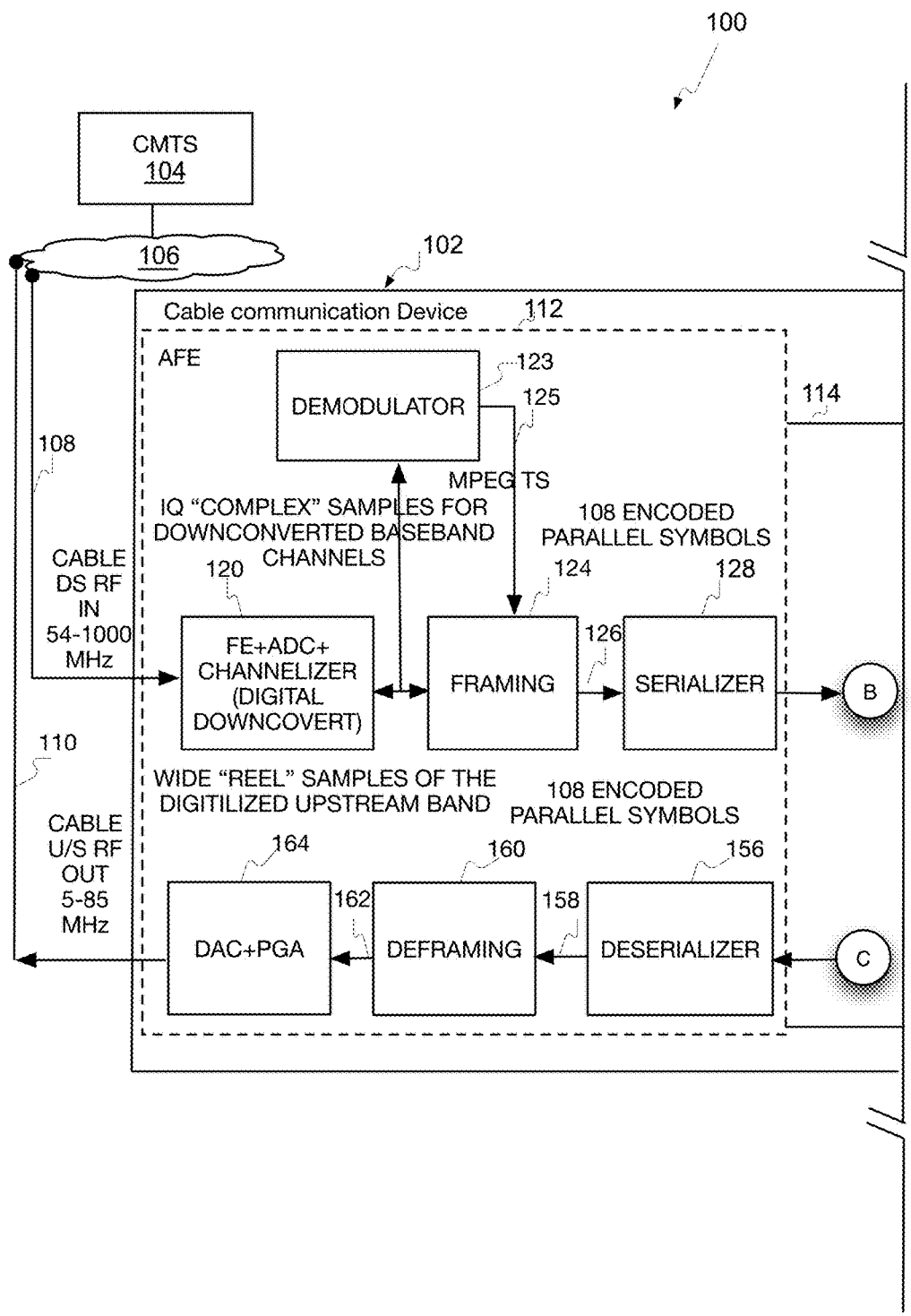
FIGS. 1A and 1B are an illustrative diagram of an example cable communication system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein. The term "and/or" as referred to herein may mean "and", it may mean "or", it may mean "exclusive-or", it may mean "one", it may mean "some, but not all", it may mean "both", although the scope of claimed subject matter is not limited in this respect.

Systems, apparatus, articles, and methods are described below including operations for transferring data between elements of a cable communication device.

As described above, a cable network may include a cable modulator-demodulator (modem) capable of transferring downstream data from a Cable-Modem-Termination-System (CMTS) to one or more devices (subscriber devices), and transferring upstream data from the devices to the CMTS. A cable communication device may typically to transfer downstream (DS) data signals from a Cable-Modem-Termination-System (CMTS) to one or more subscriber devices, and to transfer upstream (US) data signals from subscriber devices back to CMTS. For example, such a cable communication device may typically process analog downstream (DS) data signals from a Cable-Modem-Termination-System (CMTS) into digital sample data (e.g., I-Q samples) via an analog front end processor (AFE), which may be passed to a digital processor for demodulation into Moving Picture Expert Group transport stream data (e.g., MPEG TS data) prior to sending on to one or more subscriber devices. Typically, such demodulation is performed exclusively in the digital processor and not in the analog front end processor As will be described in more detail below, conversely, an analog front end processor may be configured to process digital sample data (e.g., I-Q samples) into transfer demodulated data (e.g., MPEG TS data) for transfer to the digital processor. For example, an analog front end processor may be adapted to have the ability to demodulate some of the DOCSIS/VIDEO channels that a Gateway SoC digital processor might normally be processing and the resultant data may be transferred from the analog front end processor to a Gateway SoC digital processor as a demodulated data (e.g., in the form of MPEG2 transport stream (e.g., per DOCSIS 3.0 specification)).

In some implementations, the analog front end processor may be configured to transfer demodulated data (e.g., MPEG TS data) and/or any remaining un-demodulated digital sample data (e.g., I-Q samples) between the analog front end processor and the digital processor for a Cable Gateway System. In some implementations, the digital processor might also be configured to receive the already demodulated data (e.g., MPEG TS data) and/or the remaining un-demodulated digital sample data (e.g., I-Q samples), and proceed to process the remaining un-demodulated digital sample data (e.g., I-Q samples) into remaining demodulated data (e.g., MPEG TS data).

For example, such an implementation may allow transmission of demodulated data (e.g., MPEG transport streams of Cable TV or Data Over Cable Service Interface Specification (DOCSIS) data) channels from the demodulator that resides in the analog front end processor to the digital processor. Such an implementation may allow extending the total number of channels supported (e.g., by expanding a digital processor, such as a Gateway system-on-a-chip (SoC), from 24 to 32 channels). This extension may be critical to bootstrap older digital processor technology to compete with newer devices that have an increasing number of channels (e.g., devices that are redesigned to support 32 conventional channels instead of 24 channels).

Figure 1B:
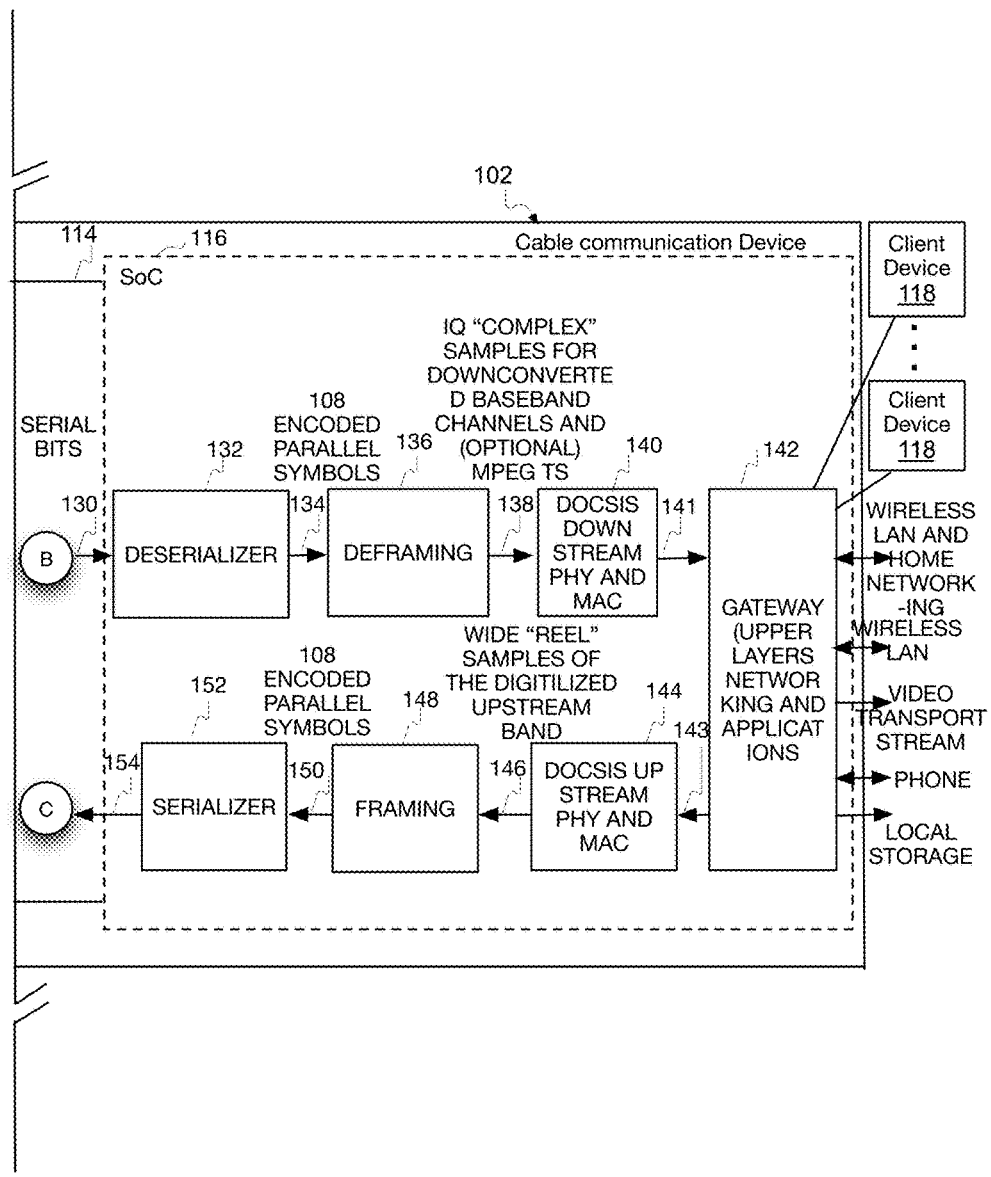

More specifically, in some implementations, some methods described herein may utilize the protocol that was described in U.S. application Ser. No. 13/976,468, filed Mar. 28, 2012, and titled "METHOD, APPARATUS AND SYSTEM OF TRANSFERRING DATA BETWEEN ELEMENTS OF A CABLE COMMUNICATION DEVICE", which is expressly incorporated herein in its entirety. For example, some methods described herein may extend this previously described protocol to support transmission of demodulated data (e.g., MPEG transport stream) in parallel with baseband digital sample data (e.g., I-Q samples). More specifically, this existing protocol for chip to chip transfer of the DOCSIS and Cable TV data channels between an AFE (analog front end processor) to the digital processor (e.g., a Gateway SoC processor) is based on encapsulating complex baseband digital sample data (e.g., I-Q samples) sent to the digital processor (e.g., a Gateway SoC processor) for demodulation. However, this existing protocol has no method for sending demodulated data over the same interface together with the baseband digital sample data. The proposed methods, as described herein, may address this problem and allow for transmission of demodulated data (e.g., in a form of an MPEG stream) to the digital processor (e.g., a Gateway SoC processor) over an existing 24 channel infrastructure of the chip to chip serial interface so as to transfer 32 baseband samples channels without requiring a full set of 32 demodulators on the Gateway SoC digital processor end. More specifically, the proposed methods, as described herein, may extend the support to 32 DATA/VIDEO channels, where 24 channels may be demodulated in the Gateway SoC digital processor end, and 8 new channels may be demodulated in the analog front end processor (e.g., the 8 new channels may be transferred to the Gateway SoC digital processor using the proposed method). Accordingly, the proposed methods may allow for transferring demodulated data in the form of MPEG TS stream over an analog front end processor to SoC serial protocol, in addition to complex baseband samples FIG. 1 is an illustrative diagram of an example cable communication system 100, arranged in accordance with at least some implementations of the present disclosure. In various implementations, system 100 may include a cable communication device 102 to transfer downstream (DS) data signals 108 from a Cable-Modem-Termination-System (CMTS) 104 to one or more devices (also referred to as "subscriber devices", or "client devices") 118, and to transfer upstream (US) data signals 110 from subscriber devices 118 to CMTS 104.

In some demonstrative embodiments, cable communication device 102 may include, or may be part of, a cable modem, a cable gateway, and the like. In some demonstrative embodiments, device 102 may communicate with CMTS 104 via a cable network 106.

In some demonstrative embodiments, system 100 may include a Cable Television (CATV) communication system capable of communicating data between CMTS 104 and client devices 118 via RF signals transmitted through network 106. Network 106 may include, for example, a network of coaxial cables and, optionally, optical fibers, e.g., if network 106 includes a Hybrid Fiber Coaxial (HFC) infrastructure. The data communicated between CMTS 104 and client devices 118 may include, for example, television data, video data, audio data, Internet data, telephony data, and the like.

In some demonstrative embodiments, one or more elements of system 100 may be configured to communicate in accordance with the Data Over Cable Service Interface Specification (DOCSIS), e.g., DOCSIS 3.0, and/or any other cable communication standard and/or specification.

In some demonstrative embodiments, client devices 118 may include, for example, at least one of a television device capable of receiving television data from CMTS 104 via device 102, a telephone device cable of exchanging telephone signals with CMTS 104 via device 102, a video device capable of receiving video data from CMTS 104 via device 102, an audio device capable of receiving audio data from CMTS 104 via device 102, an internet-protocol (IP) device capable of exchanging IP signals with CMTS 104 via device 102, a storage device capable of storing and/or processing data received from CMTS 104 via device 102, a Wireless Local Area Network (WLAN) device capable of communicating data to/from CMTS 104 via a WLAN, the like, and/or combinations thereof.

In some demonstrative embodiments, device 102 may include a Front End (FE) 112 (e.g., an analog front end) connected to a processor 116 via an interface 114, e.g., as described in detail below.

In some demonstrative embodiments, interface 114 may include a serial interface configured to serially transfer DS and/or US information between FE 112 and processor 116, e.g., as described in detail below. Interface 114 may include, for example, one or more serial lanes, e.g., as described below. For example, interface 114 may include a high speed serial interface, for example, a Serial Advanced Technology Attachment (SATA) interface, e.g., an interface in accordance with the *SATA Revision* 3.0 *electrical specification*, May 2009, a Peripheral Component Interconnect (PCI), e.g., an interface in accordance with the *PCI express version* 3.0 *electrical specification*, and the like.

In some demonstrative embodiments, DS signals 108 and US signals 110 may include analog signals configured to be transferred over cable network 106. For example, FE 112 may be configured to receive from cable network 106 the DS data signals 108 in the form of an analog input including a plurality of downstream data channels. In one non-limiting example, FE 112 may be configured to receive DS data signals 108 in the form of an analog RF signal modulated over an RF DS frequency band, e.g., an RF frequency band of 54-1002 Megahertz (MHz), or any other RF frequency band. In one non-limiting example, DS data signals 108 may include at least sixteen DS channels, at least 24 DS channels, at least 32 DS channels, or the like. In other embodiments, DS data signals 108 may be modulated over any other RF band and/or may include any other number of DS channels.

For example, FE 112 may be configured to transfer the US data signals 110 over cable network 106 in the form of an analog output including an upstream data channel. In one non-limiting example, FE 112 may be configured to provide US data signals 110 in the form of an analog RF signal modulated over an RF US frequency band, e.g., an RF frequency band of 5-85 MHz, or any other RF frequency band. In other embodiments, US data signals 110 may be modulated over any other RF band and/or may include two or more US channels.

In some demonstrative embodiments, FE 112 may be configured to convert DS data signals 108 into digital DS data signals. The DS data signals 108 may have a relatively wide bandwidth, for example, a bandwidth of about 1 Gigahertz (GHz), e.g., if DS data signals 108 are modulated over the RF frequency band of 54-1002 MHz.

In some demonstrative embodiments, processor 116 may be configured to receive the digital DS signals from FE 112 via interface 114, and to demodulate and process the DS signals, e.g., digitally.

In some demonstrative embodiments, processor 116 may include, or may be implemented as part of, a Gateway SoC. For example, processor 116 may include a Gateway SoC capable of processing downstream and/or upstream digital samples (e.g., IQ samples) corresponding to downstream and/or upstream RF channels of system 100, e.g., in accordance with the DOCSIS and/or any other standard.

In some demonstrative embodiments, FE 112 may transfer the DS digital signals to processor 116 via a stream of DS data frames, which may be configured according to a predefined data link protocol, e.g., as described in details below.

In some demonstrative embodiments, the data link protocol may include a high-speed protocol, which may be configured to enable transferring digital samples and/or MPEG transport stream data corresponding to DS signals 108 over a low pin count and/or in a power efficient and/or reliable manner.

In some demonstrative embodiments, the data link protocol may support transmission of a plurality, e.g., a large number, of cable downstream channels, for example, at least eight cable downstream channels, e.g., at least sixteen cable downstream channels, e.g., 32 cable downstream channels or more.

In some demonstrative embodiments, the data link protocol may be configured to support the transfer of a digitized upstream signal from processor 116 to FE 102 via interface 114, e.g., as described in detail below. For example, the digitized upstream signal may include US data received from client devices 118.

In some demonstrative embodiments, FE 112 may be configured to receive DS data signals 108 in the form of an analog downstream input including a plurality of downstream data channels. FE 112 may be configured to provide a digital serial downstream output 130 including at least one continuous stream of constant-size downstream frames. The downstream frames may include a plurality of constant-size downstream data frames. A downstream data frame of the downstream data frames may include, for example, a downstream payload field, which may includes downstream sample data of one or more downstream MPEG transport stream data and/or samples (e.g., IQ samples) corresponding to each channel of two or more downstream channels of DS input signals 108. For example, the payload field of the frame may include downstream MPEG transport stream data and/or sample data (e.g., IQ samples) of one or more downstream samples corresponding to each channel of a set of channels including a predefined number of the plurality of downstream data channels, e.g., as described in detail below.

In some demonstrative embodiments, processor 116 may be configured to receive digital serial downstream output 130 over serial interface 114, to process the downstream data frames, and to output, e.g., to client devices 118, a downstream output based on the downstream MPEG transport stream data and/or samples of the downstream data channels, e.g., as described in detail below.

In some demonstrative embodiments, the digital serial downstream output of FE 112 may include a plurality of serial streams transferred over a respective plurality of serial lanes of serial interface 114. According to these embodiments, a stream of the serial streams may include downstream data of a predefined number of channels of the plurality of downstream data channels.

In one example, the stream may include downstream data of sixteen channels of the plurality of downstream data channels, and the payload field may include downstream MPEG transport stream data and/or sample data of two or more downstream samples corresponding to each channel of the sixteen channels, e.g., as described below with respect to Table 2.

In another example, the stream may include downstream data of eight channels of the plurality of downstream data channels, and the payload field may include downstream MPEG transport stream data and/or sample data of four or more downstream samples corresponding to each channel of the eight channels, e.g., as described below with reference to Table 2. For example, the downstream sample data in the payload field may include an inphase (I) component and a quadrature (Q) component (e.g., IQ sample data) of each of the one or more downstream samples, e.g., as described in detail below. Similarly, the downstream MPEG transport stream data may be incorporated into the payload field in the same or similar manner as the IQ sample data, where a first MPEG transport stream might replace an inphase (I) component and a second MPEG transport stream might replace a quadrature (Q) component.

In some demonstrative embodiments, the downstream payload field may include downstream MPEG transport stream data and/or sample data of two or more downstream samples. In one example, the payload field may include two or more portions corresponding to the two or more downstream samples, respectively. For example, a particular portion corresponding to a particular downstream sample may include downstream sample data of the particular sample corresponding to each of the two or more channels. For example, the downstream sample data may be arranged within the particular portion according to an order of the two or more channels, e.g., as described below.

In some demonstrative embodiments, the stream of downstream frames may also include one or more status frames, e.g., frames, which do not include the downstream MPEG transport stream data and/or sample data. The status frames may be transmitted by FE 112, for example, as "filler" frames, e.g., in order to maintain a continuous flow of frames over interface 114, as described below.

In some demonstrative embodiments, FE 112 may include a FE+ADC+Channelizer (hereinafter DS converter or DS down converter) 120 to convert analog DS data signals 108 into a plurality of digital samples 122. For example, digital samples 122 may include digital samples of the plurality of DS channels of DS data signals 108. Digital samples 122 may include, for example, an "I" component and a "Q" component for each sample. Each of digital samples 122 may be represented, for example, by a predefined number of bits, e.g., 12 bits.

In one non-limiting example, DS data signals 108 may include DS data of at least 16 channels. According to this example, digital samples 122 may be arranged in a plurality of streams of bits, e.g., including at least 16 groups of bit streams. Each group of bit streams may correspond to a particular channel of the 16 channels. Each group of bit streams may include, for example, a stream of bits representing a stream of samples corresponding to the particular channel. For example, each group of bit streams may include 12 streams of bits representing the "I" component of the samples and 12 streams of bits representing the "Q" component of the samples. According to this example, digital samples 122 may be arranged in 16*12*2=384 streams of bits. In other embodiments, digital bits 122 may be arranged in any other suitable number of groups and/or streams.

Figure 2:
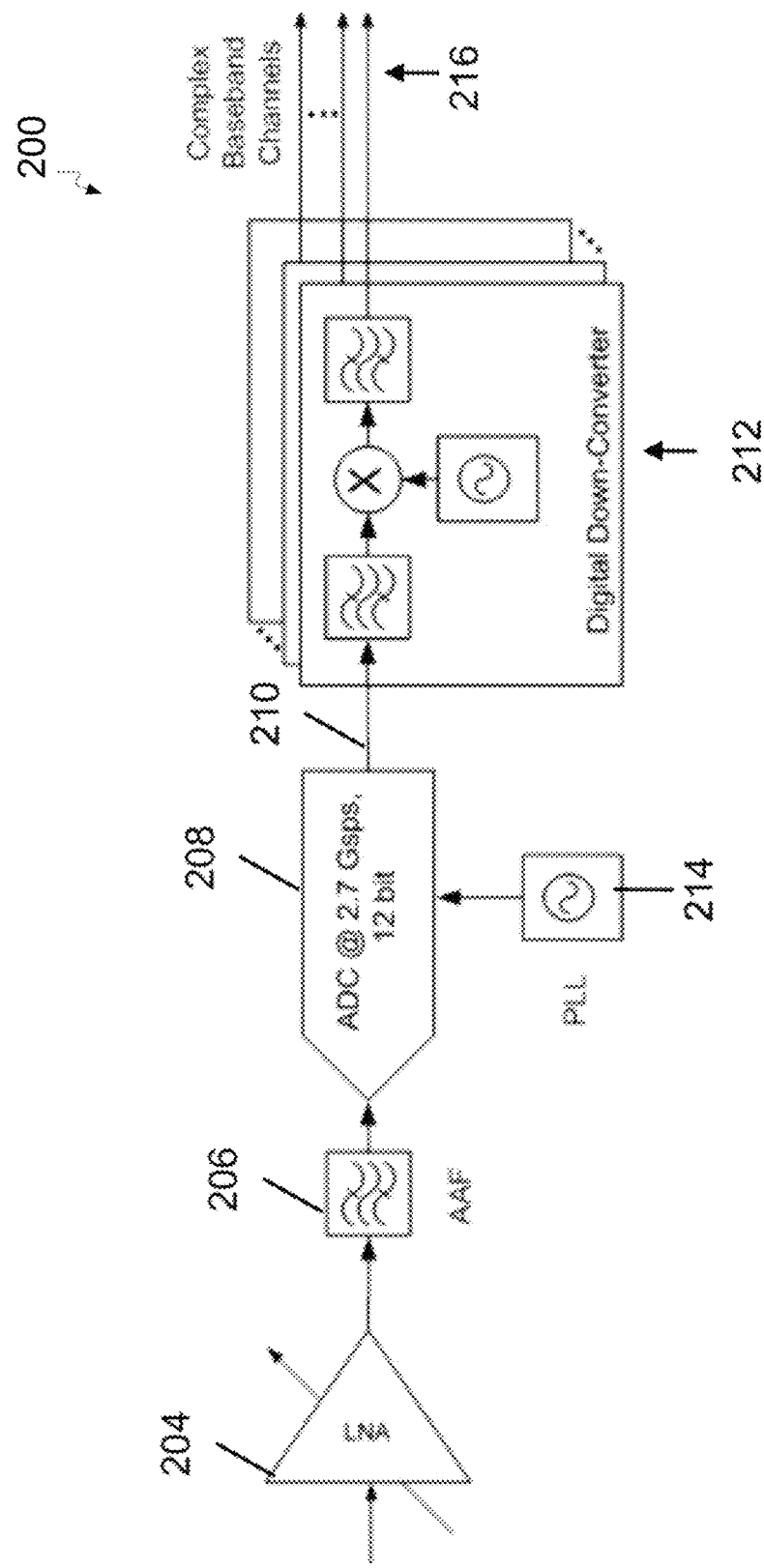
FIG. 2 is an illustrative diagram of an example downstream converter.

FIG. 2 is an illustrative diagram of an example DS converter 200, arranged in accordance with at least some implementations of the present disclosure. In various implementations, DS converter 200 may perform the functionality of DS converter 120 (FIG. 1). In some demonstrative embodiments, converter 200 may be configured to convert an analog input signal 202, e.g., including DS data signals 108 (FIG. 1), into a plurality of digital samples 216, e.g., including digital samples 122 (FIG. 1).

In some demonstrative embodiments, converter 200 may include an analog low-noise amplifier (LNA) 204 to amplify input signal 202, an analog anti-aliasing-filter (AAF) 206 to filter an output of LNA 204, and an analog-to-digital converter (ADC) to convert analog input signal 202 into a digital signal 210 including a plurality of digital samples. For example ADC 208 may convert analog input signal 202 into samples of a predefined bit-size, at a predefined sampling rate. In one example, ADC 208 may convert analog input signal 202 into 12-bit samples at a particular sampling rate (e.g., a 2.7 Giga samples per second (GSPS)). ADC 208 may be controlled, for example, by a phase-lock-loop (PLL) 214.

In some demonstrative embodiments, converter 200 may also include a plurality of digital down-converters (DDCs) 212 to down-convert samples 210 into complex baseband signals 216 corresponding to the plurality of DS channels. For example, if input signal 202 includes data of 16 DS channels, converter 200 may include 16 DDCs 212 to convert samples 210 into 16 groups of bit streams corresponding to the 16 DS channels. For example, each group of bit streams may include 12 streams of bits representing the "I" component of the samples and 12 streams of bits representing the "Q" component of the samples, e.g., as described above.

Referring back to FIG. 1, in some demonstrative embodiments, FE 112 may include a demodulator (referred to herein as FE demodulator) 123 configured to receive digital samples 122 (e.g., I-Q samples for downconverted basedband channels 122) and output one or more Moving Picture Expert Group transport streams (MPEG TS) 125.

In some demonstrative embodiments, FE demodulator 123 may perform a similar function to Docsis Downstream PHY and MAC 140 (also referred to herein as SoC demodulator). Accordingly, the operations to demodulate various channels may be split between FE demodulator 123 and SoC demodulator 140. Such an arrangement may be beneficial to support a higher number of channels where the SoC demodulator 140 may not by itself have enough demodulator hardware to support such a high number of channels. In some demonstrative embodiments, FE demodulator 123 may include one or more physical layer (PHY) and/or media-access-control (MAC) layer modules to process digital samples 122, and to generate a plurality of MPEG transport streams (TS) corresponding to at least some of the plurality of DS channels of DS input 108. For example, modules of FE demodulator 123 may include MAC and/or PHY modules in accordance with the DOCSIS and/or any other standard. In some implementations, modules of FE demodulator 123 may not include MAC, and instead, such MAC layer modules may be located on the digital processor 116. In such an implementation, input to such MAC layer modules may be in the form of MPEG TS.

In some demonstrative embodiments, FE 112 may include a framing module (referred to herein as a DS framer) 124 configured to arrange the plurality of digital samples 122 and/or MPEG transport streams 123 in a plurality of frames 126 to be transferred over interface 114, as a stream, to processor 116, e.g., as described in detail below.

In some demonstrative embodiments, framer 124 may support two framing modes corresponding to two respective baud rates, e.g., as described in detail below. In other embodiments, framer 124 may support only one of the framing modes and/or any other framing mode. For example, framer 124 may support a Full Mode (FM) corresponding to a predefined baud rate, and a Half Mode (HM), having a baud rate of half the baud rate of the FM. The HM may enable, for example, a back-up option, e.g., for reduced rate data transfer in case, for example, it is not possible to reach the FM rate with a sufficient bit error rate (BER). Alternatively, additional robustness may be achieved in case the data transfer requirement is satisfied by the HM.

In some demonstrative embodiments, framer 124 may support any specific information rate and/or serial rate, for example, such that the serial rate is equal to or higher than the information rate, e.g., inclusive of a framing redundancy.

In some demonstrative embodiments, interface 114 may include one or more DS serial lanes to transfer frames 126 generated by framer 124.

In some demonstrative embodiments, frames 126 generated by framer 124 may have a constant, predefined, frame size, e.g., as described below.

In some demonstrative embodiments, framer 124 and/or interface 114 may be configured to support various serial link rates, various numbers of DS channels, various sampling rates of FE 112, and/or any other parameters, while maintaining the constant frame size. For example, one or more of the number of channels transferred per DS lane of interface 114, and/or the number of DS lanes in interface 114 may be configured according to the serial link rate, number of DS channels, sampling rate of FE 112, e.g., the sampling rate of DDCs 212 (FIG. 2), and/or any other parameters.

In some demonstrative embodiments, the number of channels to be transferred per DS lane of interface 114 may be determined, for example, based on a specific channel sampling rate utilized by FE 112, and a link rate of interface 114, for example, such that the total information rate of data frames 126 generated by framer 124, may be equal to or lesser than the link rate of interface 114.

In some demonstrative embodiments, the number of DS lanes of interface 114 may be configured, for example, based on the number of DS channels included in DS input signals 108, and the number of channels to be used per DS lane.

In some demonstrative embodiments, the number of channels transmitted per DS lane for the HM framing mode may be half the number of channels transmitted per DS lane for the FM framing mode.

In some demonstrative embodiments, there may be no temporal dependency between the downstream lanes of interface 114, for example, if DS input 108 includes DOCSIS downstream channels, e.g., since DOCSIS downstream channels may not be correlated.

In some demonstrative embodiments, framer 124 may arrange digital samples 122 and/or MPEG transport streams 123 in at least one continuous stream of constant-size downstream frames 126 including a plurality of constant-size downstream data frames, and, optionally, a plurality of status frames. Framer 124 may generate each downstream data frame to include a downstream payload field. The payload field may include, for example, downstream MPEG transport stream data 123 and/or sample data of one or more downstream samples corresponding to each of the particular number of downstream data channels of DS data 108.

In one non-limiting example, each serial lane of interface 114 may transfer 16 channels, and framer 124 may generate a continuous stream of downstream frames 126 including a plurality of constant-size downstream data frames. In such an example, each downstream data frame may include one or more pairs of samples, e.g., two pairs of I-Q samples, corresponding to some of the 16 channels, e.g., as described in detail below. Similarly, in such an example, instead of one or more pairs of samples, each downstream data frame may include downstream MPEG transport stream data incorporated into the payload field in the same or similar manner as the I-Q sample data, where an 8 bit control, an 8 bit first MPEG transport stream, and an 8 bit second MPEG transport stream might replace a 12 bit inphase (I) component and a 12 bit quadrature (Q) component. Accordingly, if all capacity is used up for MPEG, then one lane can carry 32 MPEG channels, instead of 16 channels of I-Q pairs. For example, instead of 16 I-Q channel pairs there may be 32 separate MPEG channels (e.g., 1a, 1b, 2a, 2b . . . 16a, 16b) per serial lane. Similarly, instead of a 12 bit I sample and 12 bit Q sample, there may be an 8 bit control, a first ("a") 8 bit MPEG data stream, and a second ("b") bit MPEG data stream.

In another non-limiting example, each serial lane of interface 114 may transfer 8 channels, and framer 124 may generate a continuous stream of downstream frames 126 including a plurality of constant-size downstream data frames, each including one or more pairs of samples, e.g., four pairs of I-Q samples, corresponding to each of the 8 channels, e.g., as described in detail below.

In other embodiments, frames 126 may include data frames including any other number and/or arrangement of digital data samples and/or MPEG transport stream data.

In some demonstrative embodiments, framer 124 may generate a continuous stream of frames 126 to be continuously transmitted over interface 114, e.g., as described in detail below.

In some demonstrative embodiments, framer 124 may generate frames 126 including downstream data frames and downstream status frames. A data frame may include a data payload field carrying data of digital samples 122 and/or MPEG transport stream data 125, e.g., as described below. A status frame may not include data of digital samples 122 and/or MPEG transport stream data 125. Instead, the status frame may be utilized to deliver any predefined status information to processor 116, and/or to serve as a "filler" frame to maintain the continuous transmission of frames 126 over interface 114. For example, framer 124 may insert status frames into the stream of frames 126, e.g., asynchronously, for example, in order to match the data rate of digital samples 122 and/or MPEG transport stream data 125 to the serial rate of interface 114. For example, framer 124 may insert a status frame into frames 126 when there is no available data frame ready for transmission. The use of the status frames as fillers may allow adjusting an actual data rate of digital samples 122 and/or MPEG transport stream data 125 to a required serial rate of interface 114, e.g., provided that the serial rate is equal to or higher than the data rate including data frame redundancy.

In some demonstrative embodiments, a frame of frames 126 may include a synchronization (Sync) field, for example, a 10-bit Sync word, e.g., a K.28 Coma Sync word, followed by a payload field. Different Sync words may be used, e.g., to distinguish between data and status frames. For example, a first Sync word, e.g., a K28.5 Sync word, may be included in a data frame, and a second, different, Sync word, e.g., a K28.1 Sync word, may be included in a status frame.

In some demonstrative embodiments, the payload field may be encoded with a 10/8 bit encoding, or any other encoding. For example, if the 10/8 bit encoding is used, a total bit-length of a frame of frames 126 may be a multiple of 10 (8 before encoding).

In some demonstrative embodiments, framer 124 may output frames 126 such that a Least-Significant-Bit (LSB) is output first, and a Most-Significant-Bit (MSB) is output last. The LSB bit may be denoted "0".

In some demonstrative embodiments, the frame may also include a header field including one or more parameters relating to the frame. For example, the header field may include a value indicating whether the frame is a status frame or a data frame, a value indicating a validity of the frame, and the like.

In some demonstrative embodiments, the frame may also include an error detection and/or error correction field, e.g., a check field ("parity field") including a check value to verify integrity of at least the payload field and, optionally, the header field. For example the check field may include a cyclic redundancy check (CRC) value, a Reed-Solomon (RS) forward-error-correction (FEC) value, and the like.

In one non-limiting example, the check field may include a CRC value, which may be generated, for example, according to a generator polynomial, for example, a CRC-16 Generator polynomial, e.g., the $x^{16}+x^{15}+x^2+1$ generator polynomial as defined by American National Standards Institute (ANSI).

In another non-limiting example, the RS code may include a RS code defined over the Galois field (GF) of $GF[2^8]$, e.g., using the polynomial $x^8+x^4+x^3+x^2+1$.

In some demonstrative embodiments, a frame of frames 126 may have the following frame structure:

For MPEG channels, the 3 byte slot structure (e.g., which for a "channelized" channel may carry a 12 bit I and Q sample (24 bit)) may change according to the following table (Table 1). Each slot may be able to carry data from two MPEG channels, a single byte for each of the channels. The subsequent byte for these two MPEG channels is transmitted on the next 24 bit slot in the same Data frame. For example, suppose that out of the 16 IQ channels that a single lane can carry, the first IQ channel slot is configured to serve as MPEG TS. Then bits 0 to 23 of the Data Payload will deliver the first byte of each of the two MPEG TS channels and bits 16*24 to 16*24+23 will deliver the second byte of each of these two channels. For example, see Table 2, below.

TABLE 1

24 bit slot structure for MPEG TS transmission

| 8-bit words | Content | Description |
|---|---|---|
| 1 | Data byte from channel "a" | A data byte out of the MPEG frame of the channel. LSB first, MSB last. |
| 1 | Data byte from channel "b" | A data byte out of the MPEG frame of the channel. LSB first, MSB last. |
| 1 | Validity/ Control Byte | Bit 7 = "1" is for a Valid data in channel "a", bit 7 = "0" is for Invalid data in channel "a". Bit 6 = "1" indicates that the byte in channel "a" is the first byte in MPEG frame ("Start" indicator). Bit 6 = "0" indicates that the byte in channel "a" is NOT the first byte in MPEG frame. Bit 5 = "1" is for a Valid data in channel "b", bit 5 = "0" is for Invalid data in channel "b". Bit 4 = "1" indicates that the byte in channel "b" is the first byte in MPEG frame ("Start" indicator). Bit 4 = "0" indicates that the byte in channel "b" is NOT the first byte in MPEG frame. Other bits are reserved for future use |

As illustrated in Table 2 below, the MPEG channels may be designated using the same numbering as the IQ channels with either "a" or "b" appended. In such an example, channel 1 for IQ will become 1a and 1b for MPEG, channel 2 will become 2a and 2b, etc. Table 2 illustrates and example of a Data frame with 1 MPEG channel and 15 IQ channels.

TABLE 2

D/S Data Frame Format Example with 1 slot dedicated to MPEG channels

| 8-bit words | Content | Description |
|---|---|---|
| 1 | Sync | Data Frame Sync |
| 1 | Header | Data Frame Header |
| 1 | Data byte from channel "1a" | A data byte out of the MPEG frame of the channel. LSB first, MSB last. |
| 1 | Data byte from channel "1b" | A data byte out of the MPEG frame of the channel. LSB first, MSB last. |
| 1 | Validity/ Control Byte | Bit 7 = "1" is for a Valid data in channel "a", bit 7 = "0" is for Invalid data in channel "a". Bit 6 = "1" indicates that the byte in channel "a" is the first byte in MPEG frame ("Start" indicator). Bit 6 = "0" indicates that the byte in channel "a" is NOT the first byte in MPEG frame. Bit 5 = "1" is for a Valid data in channel "b", bit 5 = "0" is for Invalid data in channel "b". Bit 4 = "1" indicates that the byte in channel "b" is the first byte in MPEG frame ("Start" indicator). Bit 4 = "0" indicates that the byte in channel "b" is NOT the first byte in MPEG frame. Other bits are reserved for future use |
| 45 | 15 I/Q pairs of samples of 15 tuner data channels | 12 bits per sample. I first, Q second. LSB first, MSB last. Channel 0 to channel 15 |
| 1 | Data byte from channel "1a" | Next data byte out of the MPEG frame of the channel. LSB first, MSB last. |

TABLE 2-continued

D/S Data Frame Format Example with 1 slot dedicated to MPEG channels

| 8-bit words | Content | Description |
|---|---|---|
| 1 | Data byte from channel "1b" | Next data byte out of the MPEG frame of the channel. LSB first, MSB last. |
| 1 | Validity/ Control Byte | Bit 7 = "1" is for a Valid data in channel "a", bit 7 = "0" is for Invalid data in channel "a". Bit 6 = "1" indicates that the byte in channel "a" is the first byte in MPEG frame ("Start" indicator). Bit 6 = "0" indicates that the byte in channel "a" is NOT the first byte in MPEG frame. Bit 5 = "1" is for a Valid data in channel "b", bit 5 = "0" is for Invalid data in channel "b". Bit 4 = "1" indicates that the byte in channel "b" is the first byte in MPEG frame ("Start" indicator). Bit 4 = "0" indicates that the byte in channel "b" is NOT the first byte in MPEG frame. Other bits are reserved for future use |
| 45 | Next 15 I/Q pairs of samples of 15 tuner data channels | 12 bits per sample. I first, Q second. LSB first, MSB last. Channel 0 to channel 15 |
| 2 | Parity | |

In the above example, as the frames are filled at the rate of the channelized samples, the MPEG data may not be ready for each available slot for a given channel, since the demodulated data is more than twice slower than the channelized samples. When there is no MPEG TS data available for transmission, the Validity bit may be set to "Invalid" ("0"), and when there is data available it may be set to Valid ("1"). The start of the MPEG frame may be indicated by setting the "start" indicator bit in the control byte as described in Table 1.

In some demonstrative embodiments, the payload field of the frame may include digital data samples and/or MPEG transport stream data corresponding to a particular plurality of DS channel of DS data signals 108.

In one non-limiting example, the payload field of the frame may include digital data samples and/or MPEG transport stream data corresponding to each of 16 DS channels, e.g., as described below.

According to this example, the payload field of the data frame may include the complex baseband samples and/or MPEG transport stream data of the 16 DS channels for Full Mode, e.g., if 16 channels are transferred per lane of interface 114. The payload field of the data frame may include the complex baseband samples and/or MPEG transport stream data of 8 DS channels for Half Mode, e.g., if 8 channels are transferred per lane of interface 114. For example, each serial lane of interface 114 may be assigned a set of 16 particular channels of DS data 108, in the FM, or a set of 8 particular channels of DS data 108, in the HM. The payload may include a complex sample of samples 122 per channel, e.g., in the form of a pair of I and Q samples. Similarly, the payload may include a complex set of MPEG transport stream data 125 per channel, e.g., in the form of 16 "a" channel MPEG data bytes interleaved with 16 "b" channel MPEG data bytes for 16 tuner data channels. Accordingly, if all capacity is used up for MPEG, then one lane can carry 32 MPEG channels, instead of 16 channels of I-Q pairs. Zeros are transmitted instead of samples and/or MPEG transport stream data, for example, if a certain channel is not active.

For example, in cases where all channels are used for I-Q sample data, a data frame of frames 126 may have the following frame structure, e.g., in Full Mode:

TABLE 3A

I-Q sample data

| 8-bit words | Content | Description |
|---|---|---|
| 1 | Sync | Data Frame Sync |
| 1 | Header | Data Frame Header |
| 48 | 16 I/Q pairs of samples of 16 tuner data channels | 12 bits per sample. I first, Q second. LSB first, MSB last. Channel 0 to channel 15 |
| 48 | Next 16 I/Q pairs of samples of 16 tuner data channels | 12 bits per sample. I first, Q second. LSB first, MSB last. Channel 0 to channel 15 |
| 2 | Parity | |

Alternatively, in cases where all channels are used for MPEG transport stream data, a data frame of frames 126 may have the following frame structure, e.g., in Full Mode. As used herein, the terms "a" and "b" channels are just part of channel naming consistent with the 16 channels of I-Q pairs; instead of numbering the MPEG channels 1 to 32, they are named 1a, 1b, 2a, 2b . . . 16a, 16b. Accordingly, if all capacity is used up for MPEG, then one lane can carry 32 MPEG channels, instead of 16 channels of I-Q pairs.

TABLE 3B

MPEG TS

| 8-bit words | Content | Description |
|---|---|---|
| 1 | Sync | Data Frame Sync |
| 1 | Header | Data Frame Header |
| 48 | 16 "a" channels with MPEG data bytes interleaved with 16 "b" channels with MPEG data bytes and 16 control bytes for 32 tuner data channels | An 8 bit control slot, a first 8 bit "a" channel MPEG data, and a second 8 bit "b" channel MPEG data. LSB first, MSB last. Channel 0 to channel 15 |
| 48 | Next 16 "a" channels with MPEG data bytes interleaved with 16 "b" channels with MPEG data bytes and 16 control bytes for 32 tuner data channels | An 8 bit control slot, a first 8 bit "a" channel MPEG data, and a second 8 bit "b" channel MPEG data. LSB first, MSB last. Channel 0 to channel 15 |
| 2 | Parity | |

The following table (Table 4A) is a non-limiting example for a particular sample number, denoted i, given there are 16 channels per serial lane. Each 12 bit sample is fed LSB first, MSB last. Each 8 bit word (Sync, Header and Parity) is also fed LSB first, MSB last:

TABLE 4A

Parity
Parity
Chan 15, Qsample i + 1
Chan 15, Isample i + 1
. . .
Chan 1, Qsample i + 1
Chan 1, Isample i + 1
Chan 0, Qsample i + 1
Chan 0, Isample i + 1
Chan 15, Qsample i
Chan 15, Isample i
. . .
Chan 1, Qsample i TABLE 4A-continued Chan 1, Isample i
Chan 0, Qsample i
Chan 0, Isample i
Header
Sync The following table (Table 4B) is a non-limiting example for a particular sample number, denoted i, given there are 32 MPEG channels (e.g., 1a, 1b, 2a, 2b . . . 16a, 16b) per serial lane. Instead of a 12 bit I sample and 12 bit Q sample, an 8 bit control, a first ("a") 8 bit MPEG data stream, and a second ("b") bit MPEG data stream may be fed LSB first, MSB last. Each 8 bit word (Sync, Header and Parity) is also fed LSB first, MSB last:

TABLE 4B

Figure 3:
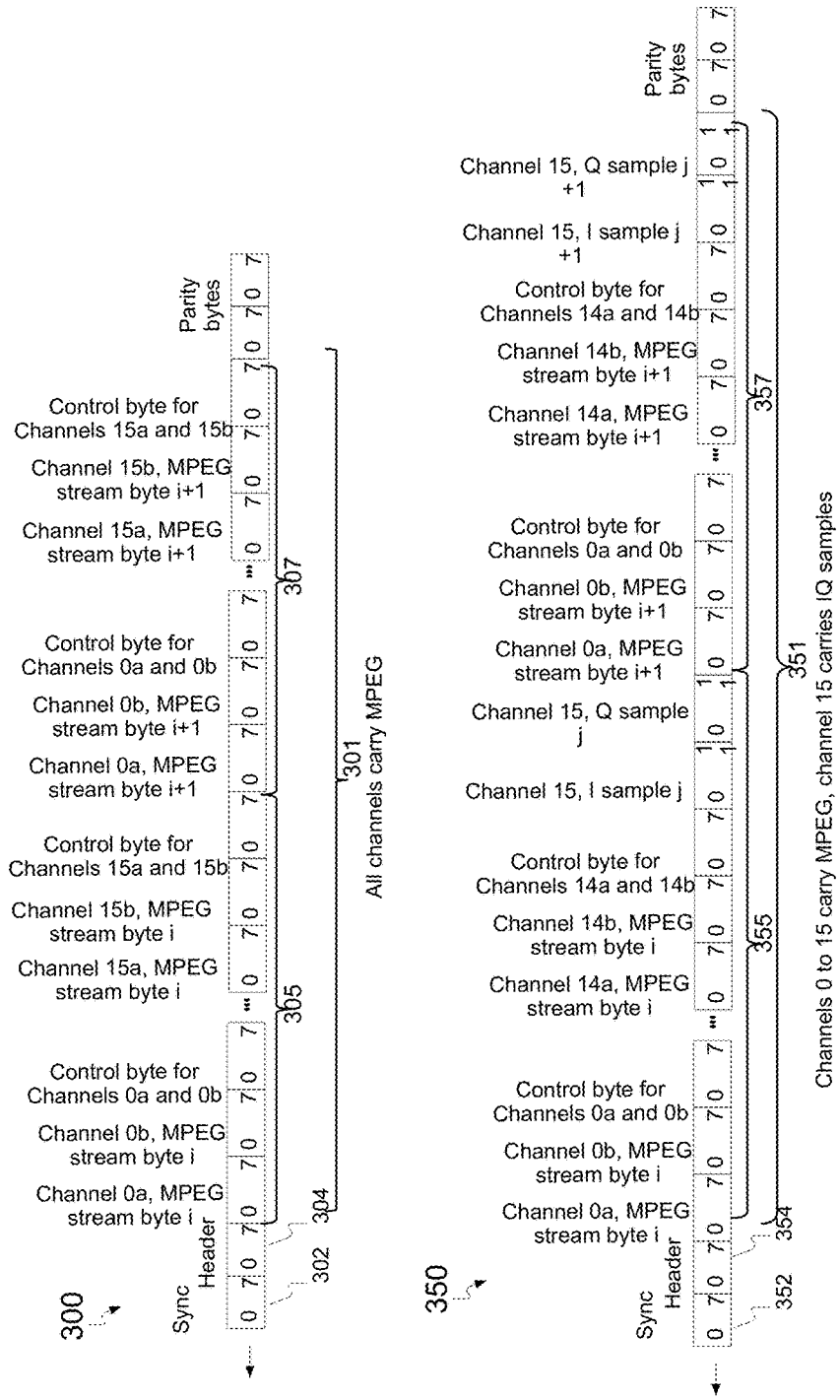
FIG. 3 is an illustrative diagram of an example data frame scheme.

Parity
Parity
Chan 15, Control byte for 15 "a" and 15 "b"
Chan 15, "b" channel MPEG TS byte i + 1
Chan 15, "a" channel MPEG TS byte i + 1
. . .
Chan 1, Control byte for 1 "a" and 1 "b"
Chan 1, "b" channel MPEG TS byte i + 1
Chan 1, "a" channel MPEG TS byte i + 1
Chan 0, Control byte for 0 "a" and 0 "b"
Chan 0, "b" channel MPEG TS byte i + 1
Chan 0, "a" channel MPEG TS byte i + 1
Chan 15, Control byte for 15 "a" and 15 "b"
Chan 15, "b" channel MPEG TS byte i
Chan 15, "a" channel MPEG TS byte i
. . .
Chan 1, Control byte for 1 "a" and 1 "b"
Chan 1, "b" channel MPEG TS byte i
Chan 1, "a" channel MPEG TS byte i
Chan 0, Control byte for 0 "a" and 0 "b"
Chan 0, "b" channel MPEG TS byte i
Chan 0, "a" channel MPEG TS byte i
Header
Sync FIG. 3 is an illustrative diagram of an example data frame scheme 300, arranged in accordance with at least some implementations of the present disclosure. In various implementations, data frame 300 optionally including two pairs of I-Q digital samples corresponding to each of 16 downstream channels and/or pairs of "a" channel MPEG data bytes interleaved with "b" channel MPEG data bytes corresponding to each of 16 downstream channels, or combinations of both the pairs of I-Q digital samples as well as pairs of "a" and "b" channel MPEG data bytes, in accordance with some demonstrative embodiments. For example, a data frame of frames 126 (FIG. 1) may have the structure of frame 300, frame 350 or the like.

As shown in FIG. 3, a Sync field 302 of frame 300, which may include an 8-bit Sync word, may be transmitted, followed by a header field 304, which may include an 8-bit header word.

As also shown in FIG. 3, header field 304 may be followed by a payload field 301 including MPEG data bytes of the two different MPEG streams. For example, instead of 16 I-Q channel pairs there may be 32 separate MPEG channels (e.g., 1a, 1b, 2a, 2b . . . 16a, 16b) per serial lane. Similarly, instead of a 12 bit I sample and 12 bit Q sample, there may be an 8 bit control, a first ("a") 8 bit MPEG data stream, and a second ("b") bit MPEG data stream. As shown in FIG. 3 payload filed 301 may include a first portion 305 including downstream MPEG data bytes portion (i), followed by a second portion 307 including downstream MPEG data bytes portion (i+1).

In some demonstrative embodiments, the downstream MPEG data may be arranged within portions (i) 305 and portion (i+1) 307 according to an order of the channels.

Alternatively, payload field 301 might instead include a mix of pairs of I-Q digital samples and as well as pairs of "a" and "b" channel MPEG data bytes. As shown in FIG. 3, a Sync field 352 of frame 350, which may include an 8-bit Sync word, may be transmitted, followed by a header field 354, which may include an 8-bit header word. Header field 354 may be followed by a payload field 351 including MPEG data (e.g., an 8 bit control, a first ("a") 8 bit MPEG data stream, and a second ("b") bit MPEG data stream) and/or pairs of I-Q digital samples. As shown in FIG. 3 payload filed 351 may include a first portion 355 including downstream MPEG data bytes and/or pairs of I-Q digital samples of the sample i, followed by a second portion 307 including downstream MPEG data bytes and/or pairs of I-Q digital samples of the sample i+1.

Alternatively, payload field 301 might instead include all pairs of I-Q digital samples including sample data of the two consecutive samples, sample i and sample i+1, of the 16 downstream channels. As shown in FIG. 3 payload filed 301 may include a first portion 305 including downstream sample data of the sample i, followed by a second portion 307 including downstream sample data of the sample i+1. For example, as shown in FIG. 3, portion 305 may include a first set of 16 pairs of twelve-bit payload words 306 representing 16 pairs of I-Q samples corresponding to the i-th sample of each of 16 DS channels. Portion 305 may be followed by portion 307 including a second set of 16 pairs of twelve-bit payload words 308 representing 16 pairs of I-Q samples corresponding to the sample i+1, subsequent to the i-th sample, of each of 16 DS channels. As shown in FIG. 3, the samples of portions 305 and 307 may be ordered according to the order of the 16 DS channels, e.g., such that two consecutive samples of a channel are separated by samples of other channels. For example, the pair of I-Q samples of the sample i of channel "0" may be separated from the pair of I-Q samples of the sample i+1 of channel "0" by fifteen pairs of I-Q samples of the sample i of the channels 1-15. Such interleaving of the samples of each channel with samples of other channels may provide, for example, a scrambling of the samples between the channels. The interleaving may result, for example, in an improved level of error detection and/or correction with respect to a particular channel, e.g., since an error may be distributed across the channels.

In another non-limiting example the payload field of the frame may include digital data samples corresponding to each of 8 DS channels, e.g., as described below.

According to this example, the payload field of the data frame may include the complex baseband samples of 8 DS channels for Half Mode, e.g., if 8 channels are transferred per lane of interface 114. For example, the payload may include one or more pairs of samples, e.g., four pairs of I-Q samples, corresponding to each of the 8 channels. Zeros may be transmitted instead of samples, for example, if a certain channel is not active.

Referring back to FIG. 1, a data frame of frames 126 may have, for example, the following frame structure, e.g., in Half Mode:

TABLE 5

| 8-bit words | Content | Description |
|---|---|---|
| 1 | Sync | Data Frame Sync |
| 1 | Header | Data Frame Header |
| 24 | 8 I/Q pairs of samples of 8 for tuner data channels | 12 bits per sample. I first, Q second, LSB first, MSB last. Channel 0 to channel 7 |
| 24 | Next 8 I/Q pairs of samples of 8 tuner data channels | 12 bits per sample. I first, Q second, LSB first, MSB last. Channel 0 to channel 7 |
| 24 | Next 8 I/Q pairs of samples of 8 tuner data channels | 12 bits per sample. I first, Q second, LSB first, MSB last. Channel 0 to channel 7 |
| 24 | Next 8 I/Q pairs of samples of 8 tuner data channels | 12 bits per sample. I first, Q second, LSB first, MSB last. Channel 0 to channel 7 |
| 2 | Parity | |

In some demonstrative embodiments, a status frame of frames 126 may have a predefined size, e.g., 10 bytes. The status frame may include a Sync word and/or a header word, e.g., as described above. The status frame may include one or more additional fields, which may have either a zero value or another, e.g., predefined, value indicating one or more predefined status parameters.

For example, a status frame of frames 126 may have the following frame structure:

TABLE 6

| Bytes | Name | Description |
|---|---|---|
| 1 | Sync | Status Frame Sync |
| 1 | Header | Status Frame Header |
| 4 | [Currently Unused, filled with zeros] | |
| 4 | [Currently Unused, filled with zeros] | |
| 2 | [Currently Unused, filled with zeros] | |

In some demonstrative embodiments, framer 124 may generate the stream of DS frames 126 in the form of a plurality of parallel bit streams, e.g., according to a rate supported by framer 124. For example, framer 124 may generate frames 126 in the form of 20 parallel bit streams, or any other number of parallel bit streams.

According to these embodiments, FE 112 may include a serializer (SER) 128 configured to generate output 130 in the form of at least one serial stream of bits including frames 126 in accordance with a configuration of interface 114, e.g., the number of lanes in interface 114 and/or the data rate of the lanes.

In some demonstrative embodiments, processor 116 may be configured to receive output 130 over interface 114, to extract digital samples 122 from frames 126, to demodulate and process the digital samples, and to provide an output to client devices 118, e.g., as described in detail below.

In some demonstrative embodiments, processor 116 may include a deserializer (DESER) 132 to convert the stream of bits of output 130 into a plurality of parallel bit streams 134 including frames 126.

In some demonstrative embodiments, processor 116 may include a deframing module (hereinafter DS deframer) 136 to extract from frames 126 a plurality of digital samples 138. For example, deframer 136 may extract digital samples 122 from frames 126, e.g., in accordance with the data link protocol described above.

In some demonstrative embodiments, deframer 136 may achieve frame synchronization with framer 124, e.g., when the K28 comma symbols of frames 126 are found in a predefined nominal position a predefined number of times, denoted S1, sequentially. The nominal position may depend on the mix of the data and status frames in the stream of frames 126. Deframer 136 may consider the frame synchronization to be lost, for example, when the frame synchronization symbol is not detected a predefined number, denoted S2, of times within a predefined number, denoted S3, of consecutive frames in the stream of frames 126. The numbers S1, S2 and/or S3 may be programmable.

In some demonstrative embodiments, a detected error in the sync word may not cause sync loss or packet loss by deframer 136.

In some demonstrative embodiments, deframer 136 may utilize one or more error counters to measure a Frame Error Rate (FER) of the stream of frames 126, e.g., based on detected errors in the check fields of the received frames.

In some demonstrative embodiments, processor 116 may include one or more physical layer (PHY) and/or media-access-control (MAC) layer modules 140 to process digital samples 138, and to generate a plurality of digital signals 141 corresponding to the plurality of DS channels of DS input 108. For example, modules 140 may include MAC and/or PHY modules in accordance with the DOCSIS and/or any other standard.

In some demonstrative embodiments, processor 116 may also include a client gateway 142 configured to distribute signals 141 to client devices 118.

In some demonstrative embodiments, processor 116 may be configured to receive an upstream input including upstream data samples corresponding to an upstream data channel. For example, processor 116 may receive the upstream input from one or more client devices 118. The upstream input may include, for example, data to be transferred from one or more of client devices 118 to CMTS 104. For example, the upstream input may include an input signal including all DOCSIS US channels modulated on a plurality of RF frequencies within an US frequency band, e.g., the frequency band of 5-85 MHz. The upstream data samples may include for example, "real" data samples, e.g., samples in a real-number representation.

In some demonstrative embodiments, processor 116 may be configured to transfer the upstream data samples to FE 112 via interface 114, e.g., as described in detail below.

In some demonstrative embodiments, processor 116 may generate a digital serial upstream output including a continuous stream of constant-sized upstream frames, e.g., as described in detail below.

In some demonstrative embodiments, the upstream frames may include a plurality of upstream data frames. For example, an upstream data frame of the upstream data frames may include an upstream payload field, which includes upstream sample data of the upstream samples, e.g., as described below.

In some demonstrative embodiments, client gateway 142 may generate a plurality of upstream data samples 143 based on upstream input signals received for client devices 118.

In some demonstrative embodiments, processor 116 may include one or more DOCSIS Upstream physical layer (PHY) and/or media-access-control (MAC) layer modules 144 to process upstream samples 143, and to generate an upstream digital signal 146 including upstream samples 143, to be provided to FE 112. For example, modules 144 may include MAC and/or PHY modules in accordance with the DOCSIS and/or any other standard.

In some demonstrative embodiments, processor 116 may include an upstream framer 148 to arrange upstream samples 143 in a plurality of upstream frames 150 to be transferred over interface 114, as a stream, to Fe 112, e.g., as described in detail below.

In some demonstrative embodiments, a status frame of frames 150 may a structure similar to the structure described above with respect to frames 126.

In some demonstrative embodiments, framer 148 may generate the stream of frames 150 in the form of a plurality of parallel bit streams, e.g., according to a rate supported by framer 148. According to these embodiments, processor 116 may include a SER 152 configured to generate an output 154 in the form of at least one serial stream of bits including frames 150 in accordance with a configuration of interface 114, e.g., the number of lanes in interface 114 and/or the data rate of the lanes.

In some demonstrative embodiments, FE 112 may be configured to receive output 154 over interface 114, to extract samples 143 from frames 150, to convert samples 143 into analog upstream data signals 110, e.g., as described in detail below.

In some demonstrative embodiments, FE 112 may include a deserializer (DESER) 156 to convert the stream of bits of output 154 into a plurality of parallel bit streams 158 including frames 150.

In some demonstrative embodiments, FE 112 may include an US deframer 160 to extract from frames 150 a plurality of digital samples 162. For example, deframer 160 may extract digital samples 162 from frames 150, e.g., in accordance with the data link protocol described above.

In some demonstrative embodiments, FE 112 may include an upstream converter (DAC+PGA) 164 to process digital samples 162, and to generate analog upstream data signals 110. For example, converter 164 may include a DAC and/or one or more other modules.

As will be discussed in greater detail below, cable communication device 102 may be used to perform some or all of the various functions discussed below in connection with FIGS. 4, 5, and/or 6.

Figure 4:
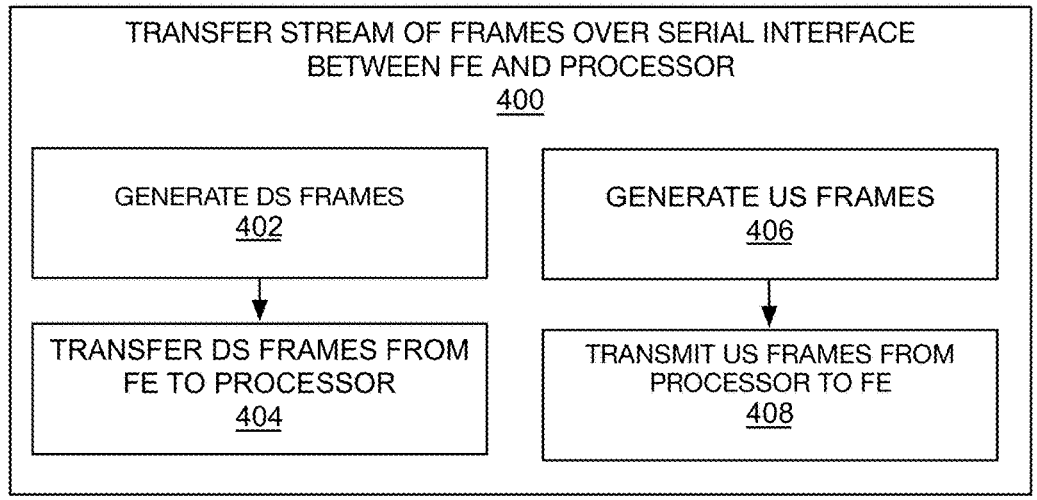
FIG. 4 is a flow diagram illustrating an example cable communication device data transfer process.

FIG. 4 is a flow diagram illustrating an example cable communication device data transfer process 400, arranged in accordance with at least some implementations of the present disclosure. In various implementations, one or more operations of the method of FIG. 4 may be performed, for example, by a system, e.g., system 100 (FIG. 1), a cable communication device, e.g., device 102 (FIG. 1), a FE, e.g., FE 112 (FIG. 1), and/or a processor, e.g., processor 116 (FIG. 1).

As indicated at block 400, the method may include transferring at least one stream of frames over a serial interface between a FE and a processor.

As indicated at block 402, the method may include generating a stream of DS frames. For example, framer 124 (FIG. 1) may generate frames 126 (FIG. 1), e.g., as described above.

As indicated at block 404, the method may include transmitting the DS frames over the serial interface from the FE to the processor. For example, FE 112 (FIG. 1) may transmit frames 126 (FIG. 1) to processor 116 (FIG. 1) over interface 114 (FIG. 1), e.g., as described above.

As indicated at block 406, the method may include generating a stream of US frames. For example, framer 148 (FIG. 1) may generate frames 150 (FIG. 1), e.g., as described above.

As indicated at block 404, the method may include transmitting the US frames over the serial interface from the processor to the FE. For example, processor 116 (FIG. 1) may transmit frames 150 (FIG. 1) to FE 112 (FIG. 1) over interface 114 (FIG. 1), e.g., as described above.

Figure 5:
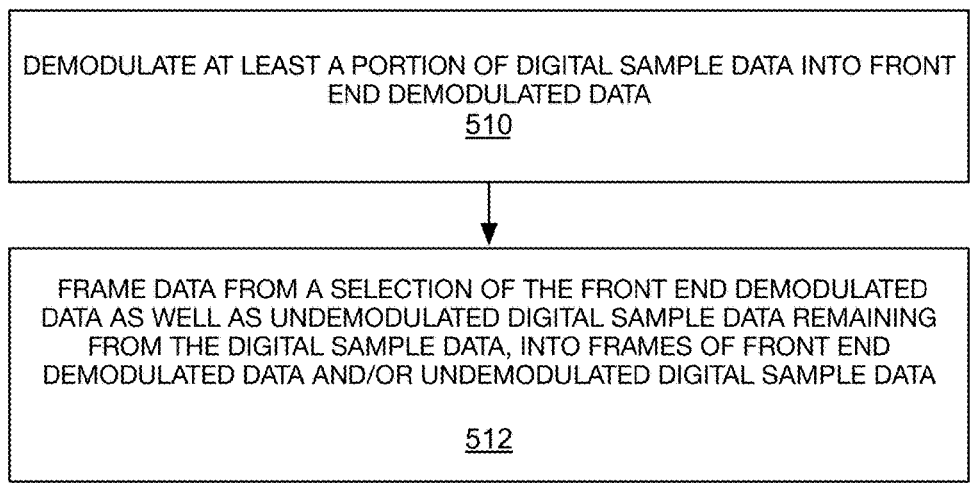
FIG. 5 is a flow diagram illustrating an example cable communication device data transfer process.

FIG. 5 is a flow diagram illustrating an example cable communication device data transfer process 500, arranged in accordance with at least some implementations of the present disclosure. Process 500 may include one or more operations, functions or actions as illustrated by one or more of operations 510, etc.

Process 500 may begin at operation 510, "DEMODULATE AT LEAST A PORTION OF DIGITAL SAMPLE DATA INTO FRONT END DEMODULATED DATA", where at least a portion of digital sample data may be demodulated. For example, at least a portion of digital sample data may be demodulated into front end demodulated data via a front end demodulator of an analog front end processor.

Process 500 may continue at operation 512, "FRAME DATA FROM A SELECTION OF THE FRONT END DEMODULATED DATA AS WELL AS UNDEMODULATED DIGITAL SAMPLE DATA REMAINING FROM THE DIGITAL SAMPLE DATA, INTO FRAMES OF FRONT END DEMODULATED DATA AND/OR UNDEMODULATED DIGITAL SAMPLE DATA", where data from a selection of the front end demodulated data as well as undemodulated digital sample data remaining from the digital sample data may be framed. For example, data from a selection of the front end demodulated data as well as undemodulated digital sample data remaining from the digital sample data may be framed, into frames of front end demodulated data and/or undemodulated digital sample data via a framer of the analog front end processor.

Some additional and/or alternative details related to process 500 and other processes discussed herein may be illustrated in one or more examples of implementations discussed herein and, in particular, with respect to FIG. 6 below.

Figure 6:
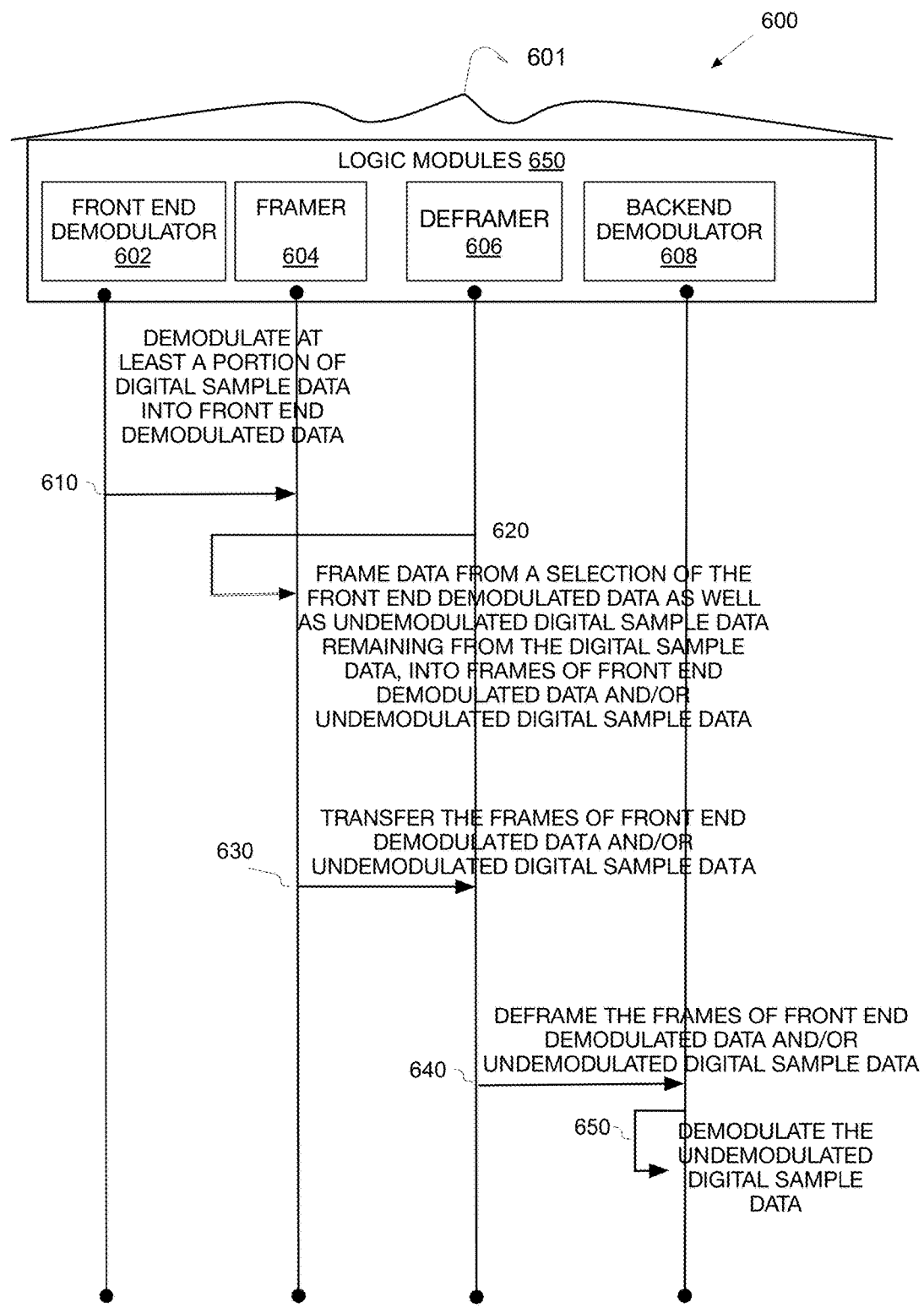
FIG. 6 provides another illustrative diagram of an example cable communication system and data transfer process in operation, all arranged in accordance with at least some implementations of the present disclosure.

FIG. 6 provides another illustrative diagram of an example cable communication system 601 and data transfer process 600 in operation, arranged in accordance with at least some implementations of the present disclosure. In the illustrated implementation, process 600 may include one or more operations, functions or actions as illustrated by one or more of actions 610, etc.

By way of non-limiting example, process 600 will be described herein with reference to example cable communication system 601 including cable communication device 102 of FIG. 1, as is discussed further herein below with respect to FIG. 6. As illustrated, cable communication system 601 may include logic modules 650. For example, logic modules 650 may include any modules as discussed with respect to any of the systems or subsystems described herein. For example, logic modules 650 may include a front end demodulator 602, a framer 604, a deframer 606, a backend demodulator 608, and/or the like.

Process 600 may begin at operation 610, "DEMODULATE AT LEAST A PORTION OF DIGITAL SAMPLE DATA INTO FRONT END DEMODULATED DATA", where at least a portion of digital sample data may be demodulated. For example, at least a portion of digital sample data may be demodulated into front end demodulated data via a front end demodulator 602 of an analog front end processor.

Process 500 may proceed from operation 610 to continue at operation 620, "FRAME DATA FROM A SELECTION OF THE FRONT END DEMODULATED DATA AS WELL AS UNDEMODULATED DIGITAL SAMPLE DATA REMAINING FROM THE DIGITAL SAMPLE DATA, INTO FRAMES OF FRONT END DEMODULATED DATA AND/OR UNDEMODULATED DIGITAL SAMPLE DATA", where data from a selection of the front end demodulated data as well as undemodulated digital sample data remaining from the digital sample data may be framed. For example, data from a selection of the front end demodulated data as well as undemodulated digital sample data remaining from the digital sample data may be framed, into frames of front end demodulated data and/or undemodulated digital sample data via a framer 604 of the analog front end processor.

Process 600 may proceed from operation 620 to continue at operation 630 "TRANSFER THE FRAMES OF FRONT END DEMODULATED DATA AND/OR UNDEMODULATED DIGITAL SAMPLE DATA", where the frames of front end demodulated data and/or undemodulated digital sample data may be transferred. For example, the frames of front end demodulated data and/or undemodulated digital sample data may be transferred from the analog front end processor to a digital processor, via the analog front end processor and a digital processor.

Process 600 may proceed from operation 630 to continue at operation 640 "DEFRAME THE FRAMES OF FRONT END DEMODULATED DATA AND/OR UNDEMODULATED DIGITAL SAMPLE DATA", where the frames of front end demodulated data and/or undemodulated digital sample data may be deframed. For example, the frames of front end demodulated data and/or undemodulated digital sample data may be deframed into front end demodulated data and/or undemodulated digital sample data, via a deframer 606 of a digital processor.

Process 600 may proceed from operation 640 to continue at operation 650 "DEMODULATE THE UNDEMODULATED DIGITAL SAMPLE DATA", where the undemodulated digital sample data may be demodulated. For example, the undemodulated digital sample data may be demodulated into remaining demodulated data, via a backend demodulator 608 of a digital processor.

In operation, some implementations of the concepts described herein may use an analog front end processor configured to process digital sample data (e.g., I-Q samples) into transfer demodulated data (e.g., MPEG TS data) for transfer to the digital processor. In some implementations, the analog front end processor may be configured to transfer demodulated data (e.g., MPEG TS data) and/or any remaining un-demodulated digital sample data (e.g., I-Q samples) between the analog front end processor and the digital processor for a Cable Gateway System. In some implementations, the digital processor might also be configured to receive the already demodulated data (e.g., MPEG TS data) and/or the remaining un-demodulated digital sample data (e.g., I-Q samples), and proceed to process the remaining un-demodulated digital sample data (e.g., I-Q samples) into remaining demodulated data (e.g., MPEG TS data).

For example, such an implementation may allow transmission of demodulated data (e.g., MPEG transport streams of Cable TV or Data Over Cable Service Interface Specification (DOCSIS) data) channels from the demodulator that resides in the analog front end processor to the digital processor. Such an implementation may allow extending the total number of channels supported (e.g., by expanding an analog front end processor, such as a Gateway system-on-a-chip (SoC), from 24 to 32 channels). This extension may be critical to bootstrap older digital processor technology to compete with newer devices that have an increasing number of channels (e.g., devices that are redesigned to support 32 conventional channels instead of 24 channels).

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 5 and 6 in response to instructions conveyed to the processor by a computer readable medium.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems as discussed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for transferring data between elements of a cable communication device may include demodulating, via a front end demodulator of an analog front end processor, at least a portion of digital sample data into front end demodulated data. A framer of the analog front end processor may frame data from a selection of the front end demodulated data as well as undemodulated digital sample data remaining from the digital sample data, into frames of front end demodulated data and/or undemodulated digital sample data.

In another example, a computer-implemented method for transferring data between elements of a cable communication device may include the demodulating of the digital sample data by demodulating only part the of digital sample data. The front end demodulated data may be MPEG2 transport stream-type data and the undemodulated digital sample data may be inphase component-quadrature component-type sample data. The analog front end processor may transfer the frames of front end demodulated data and/or undemodulated digital sample data from the analog front end processor to the digital processor. A deframer of the digital processor may deframe the frames of front end demodulated data and/or undemodulated digital sample data, into front end demodulated data and/or undemodulated digital sample data. A backend demodulator of the digital processor may demodulate the undemodulated digital sample data into remaining demodulated data. The demodulating of the undemodulated digital sample data may include demodulating only part the of digital sample data. The analog front end processor may be configured to demodulate 8 of 32 channels and the digital processor may be configured to demodulate 24 of 32 channels.

In other examples, an apparatus for an analog front end processor of a cable communication device may include a front end demodulator configured to demodulate at least a portion of digital sample data into front end demodulated data. A framer may be configured to frame data from a selection of the front end demodulated data as well as undemodulated digital sample data remaining from the digital sample data, into frames of front end demodulated data and/or undemodulated digital sample data.

In another example, the apparatus for an analog front end processor of a cable communication device may include the demodulating of the digital sample data by demodulating only part the of digital sample data. The front end demodulated data may be MPEG2 transport stream-type data and the undemodulated digital sample data may be inphase component-quadrature component-type sample data. The analog front end processor may be configured to: transfer the frames of front end demodulated data and/or undemodulated digital sample data from the analog front end processor to a digital processor; and demodulate 8 of 32 channels so as to work with the digital processor configured to demodulate 24 of 32 channels.

In other examples, a system for transferring data between elements of a cable communication device may include an analog front end processor and a digital processor associated with the analog front end processor. The analog front end processor may include a front end demodulator and a framer. The front end demodulator may be configured to demodulate at least a portion of digital sample data into front end demodulated data. The framer may be configured to frame data from a selection of the front end demodulated data as well as undemodulated digital sample data remaining from the digital sample data, into frames of front end demodulated data and/or undemodulated digital sample data. The digital processor may include a deframer configured to deframe the frames of front end demodulated data and/or undemodulated digital sample data, into front end demodulated data and/or undemodulated digital sample data.

In another example, the system transferring data between elements of a cable communication device may further include the demodulating of the digital sample data by demodulating only part the of digital sample data. The front end demodulated data may be MPEG2 transport stream-type data and the undemodulated digital sample data may be inphase component-quadrature component-type sample data. The analog front end processor may be configured to transfer the frames of front end demodulated data and/or undemodulated digital sample data from the analog front end processor to the digital processor. The digital processor may further include: a backend demodulator configured to demodulate the undemodulated digital sample data into remaining demodulated data, where the demodulating of the undemodulated digital sample data includes demodulating only part the of digital sample data. The analog front end processor may be configured to demodulate 8 of 32 channels and the digital processor may be configured to demodulate 24 of 32 channels.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A method for transferring data between elements of a cable communication device, comprising:

demodulating, via a front end demodulator of an analog front end processor, only a portion of a plurality of channels into a first portion of front end demodulated channels while leaving a remaining second portion of the plurality of channels as undemodulated channels;

framing, via a framer of the analog front end processor, data from a selection of the front end demodulated channels as well as the undemodulated channels remaining from the plurality of channels, into frames of front end demodulated data and/or undemodulated digital sample data;

transferring, via the analog front end processor and a digital processor, the frames of front end demodulated channels and/or undemodulated channels from the analog front end processor to the digital processor;

deframing, via a deframer of the digital processor, the frames of front end demodulated data and/or undemodulated digital sample data, into front end demodulated channels and/or undemodulated channels; and demodulating, via a backend demodulator of the digital processor, only the remaining second portion of the plurality of channels from undemodulated channels into remaining demodulated channels after the framing operation and after the deframing operation is performed.

2. The method of claim 1, wherein the front end demodulated channels include MPEG2 transport stream-type data and the undemodulated channels include inphase component-quadrature component-type sample data.

3. The method of claim 1, wherein the analog front end processor is configured to demodulate 8 of 32 channels and the digital processor is configured to demodulate 24 of 32 channels.

4. The method of claim 1, further comprising:
wherein the front end demodulated channels include MPEG2 transport stream-type data and the undemodulated channels include inphase component-quadrature component-type sample data,
wherein the analog front end processor is configured to demodulate 8 of 32 channels and the digital processor is configured to demodulate 24 of 32 channels.

5. An analog front end processor of a cable communication device, comprising:
a front end demodulator configured to demodulate only a portion of a plurality of channels into a first portion of front end demodulated channels while leaving a remaining second portion of the plurality of channels as undemodulated channels, wherein the remaining second portion of the plurality of channels are to be demodulate from undemodulated channels into remaining demodulated channels after the framing operation only via a separate backend demodulator;
a framer configured to frame data from a selection of the front end demodulated channels as well as the undemodulated channels remaining from the plurality of channels, into frames of front end demodulated data and/or undemodulated digital sample data;
the analog front end processor being configured to:
transfer the frames of front end demodulated data and/or undemodulated digital sample data from the analog front end processor to a digital processor; and
demodulate 8 of 32 channels so as to work with the digital processor configured to demodulate 24 of 32 channels.

6. The analog front end processor of claim 5, wherein the front end demodulated channels include MPEG2 transport stream-type data and the undemodulated channels include inphase component-quadrature component-type sample data.

7. A system for transferring data between elements of a cable communication device, comprising:
an analog front end processor, comprising:
a front end demodulator configured to demodulate only a portion of a plurality of channels into a first portion of front end demodulated channels while leaving a remaining second portion of the plurality of channels as undemodulated channels;
a framer configured to frame data from a selection of the front end demodulated channels as well as the undemodulated channels remaining from the plurality of channels, into frames of front end demodulated data and/or undemodulated digital sample data; and
a digital processor associated with the analog front end processor, the digital processor comprising:
a deframer configured to deframe the frames of front end demodulated data and/or undemodulated digital sample data, into front end demodulated channels and/or undemodulated channels; and
a backend demodulator configured to demodulate only the remaining second portion of the plurality of channels from undemodulated channels into remaining demodulated channels after the deframing operation.

8. The system of claim 7, wherein the front end demodulated channels include MPEG2 transport stream-type data and the undemodulated channels include inphase component-quadrature component-type sample data.

9. The system of claim 7, further comprising:
the analog front end processor being configured to transfer the frames of front end demodulated data and/or undemodulated digital sample data from the analog front end processor to the digital processor.

10. The system of claim 7, wherein the analog front end processor is configured to demodulate 8 of 32 channels and the digital processor is configured to demodulate 24 of 32 channels.

11. The system of claim 7, further comprising:
wherein the front end demodulated channels include MPEG2 transport stream-type data and the undemodulated channels include inphase component-quadrature component-type sample data,
the analog front end processor being configured to transfer the frames of front end demodulated data and/or undemodulated digital sample data from the analog front end processor to the digital processor; and
the analog front end processor being configured to demodulate 8 of 32 channels and the digital processor being configured to demodulate 24 of 32 channels.

* * * * *